May 5, 1931.  J. HUTT  1,804,341
ACOUSTICAL DEVICE
Filed Aug. 23, 1927

Inventor:
Joseph Hutt,
by
His Attorney.

Patented May 5, 1931

1,804,341

UNITED STATES PATENT OFFICE

JOSEPH HUTT, OF COVENTRY, ENGLAND, ASSIGNOR TO GENERAL ELECTRIC COMPANY, A CORPORATION OF NEW YORK

ACOUSTICAL DEVICE

Application filed August 23, 1927, Serial No. 214,970, and in Great Britain February 23, 1927.

My invention relates to acoustical devices comprising a horn or trumpet for magnifying sound, and has for its principal object the provision of an improved horn which is very compact in form and possesses good acoustic properties.

My invention will be better understood from the following description when considered in connection with the accompanying drawings and its scope will be pointed out in the appended claims.

Figure 1:
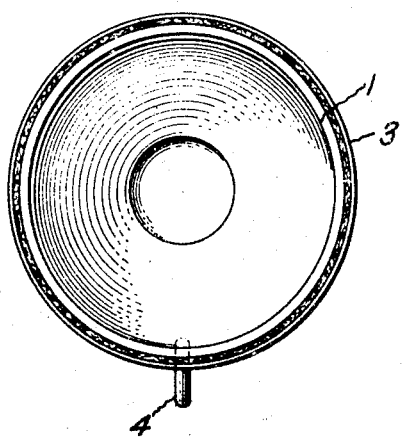
Figure 2:
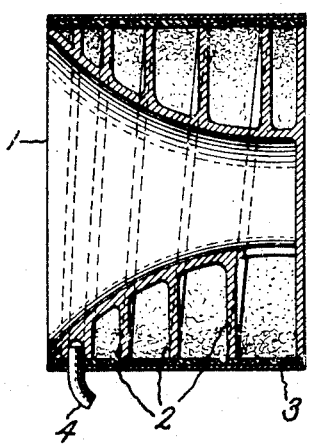

Referring to the drawings, Figs. 1 and 2 show different views of a loud speaker horn constructed in accordance with my invention. This horn comprises a flaring member 1 surrounded by a helical rib or partition 2 which extends between the outer surface of the flaring member and the inner surface of a casing 3 so as to form a helical passageway connected at one end to a short tube 4 and at the other end to the smaller opening of the flaring member. This passageway preferably increases in sectional area from the tube 4 to the opening into the flaring member in accordance with the well known law governing high efficiency in loud speaker horns. It should be observed that the larger end of the flaring member is of substantially the same cross-section as that of the casing 3. A sound producing device, such as a telephone receiver, may be connected to the smaller end of the helical passageway thus formed between the flaring member 1, the partition 2 and the casing 3.

It will be readily understood that the flaring member may conveniently be cast in two halves fitted together with an enclosing cover of cardboard, sheet metal, or the like, and that felt, rubber, or other compressible gaskets may be utilized to make sound-tight joints between the various parts of the horn.

What I claim as new and desire to secure by Letters Patent of the United States, is:

1. An acoustical device comprising a hollow cylindrical casing including closed and open ends, a flaring member extending between said ends and attached to said closed end, and a partition arranged to form between said member and said casing a helical passageway which opens into the smaller end of said member.

2. An acoustical device comprising a hollow cylindrical casing including closed and open ends, a flaring member enclosed by said casing and attached to said closed end of said casing, and a partition arranged to form between said member and said casing a helical passageway which opens into the smaller end of said member at a point thereof adjacent said closed end of said casing.

In witness whereof, I have hereunto set my hand this 18th day of July, 1927.

JOSEPH HUTT.